3,433,588
METHOD FOR THE PREPARATION OF
4 ANGSTROM UNIT ZEOLITES
Max Michel, Sarcelles-les-Rosiers, and Denis Papee,
Paris, France, assignors to Produits Chimiques
Pechiney-Saint-Gobain, Neuilly-sur-Seine, France
No Drawing. Filed Mar. 17, 1965, Ser. No. 440,626
Claims priority, application France, Mar. 20, 1964,
968,128
U.S. Cl. 23—113                    6 Claims
Int. Cl. C01b 33/28

ABSTRACT OF THE DISCLOSURE

The invention relates to the preparation of an improved synthetic sodium zeolite and to the process for the preparation of same comprising gradually adding a sodium silicate liquor to a sodium aluminate liquor to form a precipitate and in which the sodium silicate liquor has a ratio of $Na_2O/SiO_2$ within the range of .5 to 10 and a ratio of $H_2O/Na_2O$ within the range of 5 to 50, and in which the sodium aluminate liquor has a ratio of $Na_2O/Al_2O_3$ within the range of 1.2 to 2 and a ratio of $H_2O/Na_2O$ within the range of 20 to 50, agitating the mixture during the addition of the sodium aluminate liquor and in which the sodium silicate liquor is added to the sodium aluminate liquor in an amount and rate to maintain the concentration of $Na_2O$ in the liquid phase relatively constant during the precipitation while constantly removing silica for substantially complete removal of silica from the resulting liquid phase and to remove not more than 80% of the alumina present in the sodium aluminate liquor, and aging the precipitate at a temperature within the range of 60–90° C. for a period of time which may range from 1 to 3 hours.

---

This invention relates to synthetic sodium zeolites having a pore size of about 4 angstrom units and to a new and improved process for the preparation of same.

The great technological interest in synthetic zeolites stems in part from their uniform pore size and their power in ion exchange. Amongst the synthetic zeolites, the one most often used and the subject of numerous investigations from the standpoint of manufacture and use is the zeolite formed with sodium silico aluminate having the approximate formula $$Na_2O/Al_2O_3/2SiO_2/YH_2O$$

in which Y is a whole number of very wide limits and which has a pore size of about 4 angstrom units. The process of manufacture most often employed comprises the silica and alumina coprecipitation of sodium silico aluminate from a hydrated state in aqueous solutions containing the different oxides. The coprecipitation product is aged whereby the gel transforms into the desired crystalline form.

Procurement of the desired crystalline size is not the only matter required to be taken into consideration for industrial use of the synthetic zeolite. It is also desirable that the micro-crystals or agglomerates be sufficiently developed and sound and without parasitic micro-porosities which might operate to decrease the desirable characteristics of selective absorbency. Otherwise, it will be obvious that the selectivity of the absorption and yield of the reaction will depend on the crystallographic purity of the zeolite employed since any other crystallized or uncrystallized elements will either be inactive or form reactions other than those desired. Finally, from the standpoint of farbrication of the zeolite, it is desirable to make use of a process in which the by-products that are formed are easily recoverable and in which the process makes most efficient utilization of the capacity of the equipment, as by the ability to make use of sufficiently concentrated solutions.

The raw materials most often used in the preparation of such synthetic zeolites are solutions of sodium aluminate and sodium silicate in which the soda is present in an amount in excess of that called for in the theoretical formula. The process that is usually practiced with such solutions generally results in an evolution of the composition in the reacting medium which, during precipitation, favors the appearance of varieties of crystallized and uncrystallized silico aluminate which differ from the zeolite having a desired porosity of 4 angstrom units.

Thus it is an object of this invention to provide a process for the manufacture of synthetic zeolites of about 4 angstrom units which gives optimum results from the standpoint of efficient utilization of the equipment and from the standpoint of size, soundness, purity and uniformity of crystals in the formed synthetic zeolite and which is also characterized by low parasitic porosity, and it is a related object to produce a new and improved synthetic zeolite of about 4 angstrom units porosity produced in accordance with the practice of this invention.

The desired results are achieved, in accordance with the practice of this invention, by progressively mixing with agitation a sodium silicate liquor in which the ratio of $Na_2O/SiO_2$ is within the range of 0.5 to 10 and preferably within the range of 0.6 to 3, and in which the ratio of $H_2O/Na_2O$ is within the range of 5 to 50, with a sodium aluminate liquor in which the ratio of $$Na_2O/Al_2O_3$$

is within the range of 1.2 to 2 and preferably within the range of 1.4 to 1.8 and in which the ratio of $H_2O/Na_2O$ is within the range of 20 to 50. The ratio of $H_2O/Na_2O$ of each solution is selected so that, during precipitation, the concentration of $Na_2O$ in the liquid phase will remain substantially constant. The precipitation can be carried out at a temperature within the range of 60–90° C. and preferably at a temperature of about 75° C. The sodium silicate solution is added in an amount and rate such that the alumina present in the precipitate represents at the best 80% of the initial amount of alumina contained in the solution of sodium aluminate. The precipitate is aged and processed in the conventional manner generally employed in the art.

It has been found that the concentration of soda in the liquid medium, at the time of the precipitation of the silico aluminate during addition of the solution of sodium silicate to the solution of sodium aluminate, has considerable influence on the purity of the zeolite and in the uniformity in formation of crystals of about 4 angstrom units. The more constant the concentration of soda, the greater the consistency of the properties of the formed sodium zeolite. The soda concentration in the spent solution should be high such that greater quantities of silica and alumina can be maintained without too rapid decomposition to enable increased production from equipment of a given capacity.

It has been found that zeolite of 4 angstrom units, corresponding to the aforementioned formula, and containing a low quantity of silica, can be easily obtained in a pure state in a medium rich in alumina when carried out by the progressive addition of sodium silicate liquor to the sodium aluminate liquor.

The precipitate that is formed during the operation contains almost all of the silica thereby substantially to eliminate silica from the liquid reacting medium. When the amount of alumina in the reacting medium is too low because of the formation of silico aluminate, a progressive deposit of silica by sodium silicate can lead to the separation of precipitates other than that for the formation of pure 4 angstrom units zeolite. Therefore, care should be exercised not to exceed the 80% rate of alumina utilization. The temperature of the solution during admixture is not critical but it is desirable to maintain the reacting medium at a moderate temperature within the aforesaid limits while carrying out the addition of the sodium silicate liquor. The aging process can be carried out at the moderate temperature when precipitation has been completed.

The described process embodies a number of improvements from the standpoint of economics as well as from the standpoint of technology. The precipitate of sodium silico aluminate leaves a solution which has a high concentration of soda and which is still rich in alumina but substantially free of silica and the solution therefore can be used in an alumina Bayer circuit. In commercial practice, it has been found advantageous to join the described process for the manufacture of synthetic zeolite with a Bayer process and thus proceed in a continuous operation in the addition of sodium silicate liquor to the sodium aluminate solution as provided from the Bayer circuit and to return the aluminate solution, after removing the precipitate of the alumina silicate, to the Bayer system.

In the following examples, Examples 1 and 2 are given to represent the preparation of 4 angstrom units zeolite by methods heretofore commonly employed, while Examples 3 to 6 represent the preparation of 4 angstrom units zeolite in accordance with the concepts of this invention. The Examples 3 to 6 are not given by way of limitation, but are given by way of illustration to show the importance of the concentration of soda in the production of 4 angstrom units zeolite having greatly improved properties with the rate of utilization of the alumina $\tau$ being variable, depending upon the composition of the solution.

EXAMPLE 1

120 ml. of a commercial solution of sodium silicate (385 g./l. $SiO_2$, 115 g./l. $Na_2O$, ratio $H_2O/Na_2O=27$) at room temperature is mixed with agitation with 1450 ml. of a sodium aluminate solution, also at room temperature. This last solution is obtained by mixing 1200 ml. of a solution of sodium aluminate at 150 g./l. $Al_2O_3$ and 150 g./l. of $Na_2O$, the ratio of which $H_2O/Na_2O=21$ with 250 ml. of a solution of caustic soda at 250 g./l. of $Na_2O$.

The reacting medium is progressively heated up to 80° C. and mixing is continued for a period of time of 90 min. until this temperature is reached. The suspension is dried, then washed with permutated water. The obtained product is centrifuged and activated at 400° C. The ratio $H_2O/Na_2O$ of the liquid phase is 21.

EXAMPLE 2

Use is made of the same solutions as in the preceding example, but the sodium silicate solution is progressively added to the mixture of the sodium aluminate solution with the caustic soda solution maintained at 75–80° C. When the precipitation is over, the temperature and the agitation are maintained for 120 min. The precipitate is processed as in the preceding example. The final ratio $H_2O/Na_2O$ in the liquid phase varies during the precipitation and it equals 21 when the precipitation is completed.

EXAMPLE 3

Use is made of the same three solutions as in the preceding examples, but the 120 ml. of the sodium silicate solution are first mixed with the 250 ml. of the caustic soda solution. With agitation, this mixture is progressively added for a period of time of 50 min. to the 1200 ml. of the sodium aluminate solution heated to 75° C. The mixture is maintained at this temperature for 150 min. with agitation. When the precipitation is over, the slurry is then centrifuged and the separated crystals washed and activated as in the preceding examples. The ratio $H_2O/Na_2O$ of the mother liquor is constant and equal to 21 during the precipitation.

EXAMPLE 4

1500 ml. of sodium silicate solution having 14.5 g./l. of $SiO_2$ and 106 g./l. of $Na_2O$ is progressively added over a period of 150 min., with agitation, to 3000 ml. of a sodium aluminate solution at 78 g./l. of $Al_2O_3$ and 90 g./l. $Na_2O$. The temperature is maintained at 75° C.; the aging time after the addition of the silicate is 150 min. The rest is carried out as aforestated and the ratio $H_2O/Na_2O$ of the mother liquor is held at 37 during the precipitation time.

EXAMPLE 5

700 ml. of a sodium silicate solution containing 132 g./l. of $SiO_2$ and 194 g./l. of $NaO_2$ are progressively added to 1336 ml. of a sodium aluminate solution titrating 142 g./l. of $Al_2O_3$ and 155 g./l. of $Na_2O$, maintained at 75° C. with agitation. The agitation is continued for 120 min. at this temperature, then the rest is carried out as aforestated. The ratio $H_2O/Na_2O$ of the mother liquor was constant and equal to 21.

EXAMPLE 6

450 ml. of a sodium silicate solution containing 375 g./l. of $SiO_2$ and 255 g./l. of $Na_2O$ are progressively added over a period of 100 min. to 2800 ml. of a sodium aluminate solution titrating 68 g./l. of $Al_2O_3$ and 74 g./l. of $Na_2O$ while the materials are maintained under agitation and at a temperature of 90° C. The agitation is contined for 180 min. at this temperature. The rest is carried out as afterstated. The ratio $H_2O/Na_2O$ of the mother liquor equals 45.

On the following table are shown the characteristics of the zeolites obtained according to the different examples and in which the following measures were determined.

(1) The rate of utilization of alumina.

(2) The quantity of water fixed under the atmospheric pressure in air containing 10% of the pressure of water of saturation at 25° C. and stated in cm.$^3$/100 g. This corresponds to the total porosity.

(3) The adsorption of benzene, also stated in cm.$^3$/100 g. which gives the porosity above 5 angstrom units (parasitic porosity).

(4) The size of the monocrystals of the obtained zeolites in $\mu$.

(5) The yield of zeolites in grams per liter of the reacting medium.

| Example | $H_2O/Na_2O$ | $\tau$ in percent | Steam adsorption in cm.$^3$/100 g. (total porosity) | Adsorption of benzene cm.$^3$/100 g. (porosity >5 A.) | Monocrystals, $\mu$ | Yield in zeolite, g./l. | Obtained zeolite (X-rays) |
|---|---|---|---|---|---|---|---|
| 1 | 21 | 24 | 20.2 | 6 | 0.1 | 70 | 4 A.+10% crystalline impurities. |
| 2 | Var. | 24 | 21 | 2.6 | 1 | 70 | 4 A.+1 to 2% of impurities. |
| 3 | 21 | 24 | 22 | 0.5 | 1 to 2 | 70 | 4 A. pure. |
| 4 | 37 | 8 | 21.5 | 0.05 | 1 to 2 | 12 | d. |
| 5 | 21 | 44 | 21.8 | 0.8 | 1 to 2 | 107 | d. |
| 6 | 45 | 77 | 22 | 0.1 | 1 | 121 | d. |

This table shows that the zeolites obtained according to the process of the invention (Examples 3, 4, 5 and 6) are almost without parasitic porosity, this porosity being always inferior to 1 cm.³/100 g. in pores superior to 5 angstrom units, the crystals constituting these zeolites having a size at least equal to 1μ. Besides, in the Examples 5 and 6, the produced zeolite per liter of the reacting medium is in quantity superior indeed to the one produced in Examples 1 and 2, while being of a very good quality.

It will be understood that changes may be made in the details of formulation and operation without departing from the spirit of the invention, especially as defined in the following claims.

We claim:

1. The process for the preparation of sodium zeolites of about 4 angstrom units comprising gradually adding a liquor of sodium silicate to a liquor of sodium aluminate to form a precipitate and in which the sodium silicate liquor has a mol ratio of $Na_2O/SiO_2$ within the range of .5 to 10 and a mol ratio of $H_2O/Na_2O$ within the range of 5 to 50, and in which the sodium aluminate solution has a mol ratio of $Na_2O/Al_2O_3$ within the range of 1.2 to 2 and a mol ratio of $H_2O/Na_2O$ within the range of 20 to 50, agitating the mixture during addition of the sodium silicate and in whic hthe sodium silicate liquor is added in an amount and rate to maintain the concentration of $Na_2O$ in the liquid phase substantially constant during the precipitation while constantly removing silica for substantially complete removal from the resulting liquid phase and to remove not more than 80% of the alumina introduced with the sodium aluminate liquor, and aging the precipitate.

2. The process as claimed in claim 1 in which the mol ratio of $Na_2O/SiO_2$ in the sodium silicate liquor is within the range of .6 to 3.

3. The process as claimed in claim 1 in which the mol ratio of $Na_2O/Al_2O_3$ in the sodium aluminate solution is within the range of 1.4 to 1.8.

4. The process as claimed in claim 1 in which the liquid mixture, during precipitation, is maintained at a temperature within the range of 60–90° C.

5. The process as claimed in claim 1 in which the precipitation is carried out while the mixture of liquids is maintained at a temperature of about 75° C.

6. The process as claimed in claim 1 in which the precipitate is aged by maintaining the precipitate at a temperature within the range of 60–90° C. for a period of time within the range of 1 to 3 hours.

References Cited

UNITED STATES PATENTS

| 2,982,612 | 5/1961 | Barrer et al. | 23—113 |
| 3,058,805 | 10/1962 | Weber | 23—113 |
| 3,071,434 | 1/1963 | Frilette et al. | 23—113 |

EDWARD J. MEROS, *Primary Examiner.*